J. H. HALL.
ELECTRIC CONTROLLER.
APPLICATION FILED SEPT. 8, 1916.
Reissued Nov. 13, 1917. 14,394.
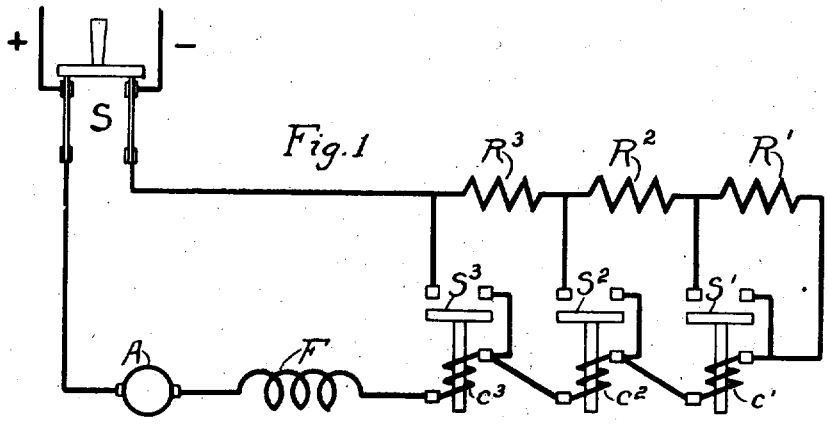
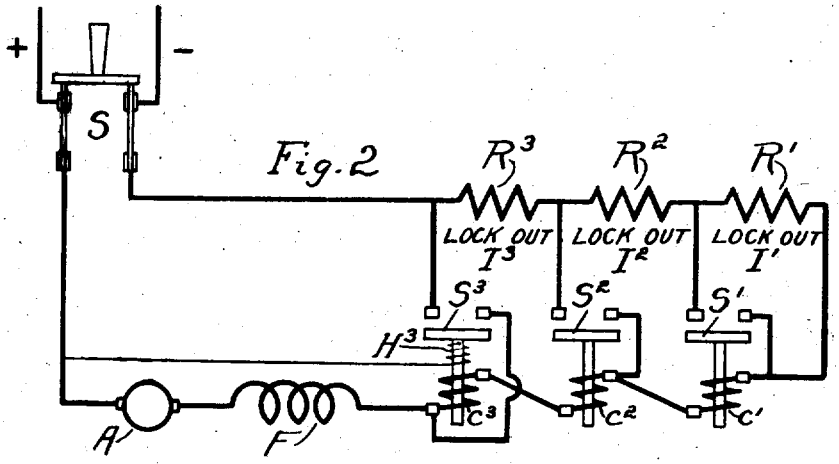
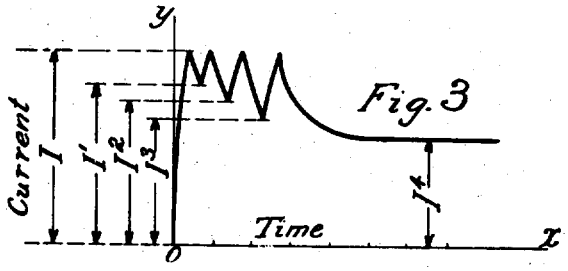
INVENTOR
Jay H. Hall
BY
F. N. Barber
ATTORNEY

UNITED STATES PATENT OFFICE.

JAY H. HALL, OF MORGANTON, NORTH CAROLINA, ASSIGNOR TO THE ELECTRIC CONTROLLER AND MANUFACTURING COMPANY, OF CLEVELAND, OHIO, A CORPORATION OF OHIO.

ELECTRIC CONTROLLER.

14,394. Specification of Reissued Letters Patent. Reissued Nov. 13, 1917.

Original No. 1,175,441, dated March 14, 1916, Serial No. 657,496, filed October 30, 1911. Renewed May 25, 1915, Serial No. 30,463. Application for reissue filed September 8, 1916. Serial No. 119,136.

*To all whom it may concern:*

Be it known that I, JAY H. HALL, a citizen of the United States, residing at Morganton, in the county of Burke and State of North Carolina, have invented new and useful Improvements in Electric Controllers, of which the following is a specification.

My invention relates to automatic controllers for electric motors wherein the operation of the resistance-controlling switches is governed by the current flowing in the motor circuit.

It is one of the objects of my invention to provide a motor-controller having resistance-controlling switches energized by the current in the motor circuit, and adapted to lock open when the current is above a certain predetermined limit and to operate when the current decreases below that limit, the said switches being further adjusted to lock out at different values of current in the motor circuit.

Referring to the accompanying drawing, Figure 1 is a diagrammatic view embodying my invention; Fig. 2, a modification thereof; and Fig. 3, a curve showing the values of current for locking out the successively closing switches.

Referring to Fig. 1, S indicates a line switch, A the armature of the motor to be controlled, and F the series field thereof. Sections of starting resistance are shown at $R'$, $R^2$, $R^3$ which are controlled, respectively, by the switches $S'$, $S^2$, and $S^3$, their respective operating windings $c'$, $c^2$, and $c^3$ being all in series in the motor circuit and energized by the current therein. The switches $S'$, $S^2$, and $S^3$ are of that type of switch described in Harry R. Canfield's application, Serial Number 583,000, filed September 21, 1910, and Serial Number 604,331, filed January 23, 1911, and in Eastwood's Patent, No. 1,040,292, granted October 8, 1912. In these applications and in this patent, particularly in Fig. 2, is shown a switch which has the peculiar characteristic of locking open when the current in its operating winding rises above a certain value, and of closing its contacts when the current in its operating winding decreases to or below that value. Furthermore, the adjustment of the switches $S'$, $S^2$, and $S^3$ is such that the locking-out value of current for the switch $S'$ is higher than the locking out value of current for the switch $S^2$, which in turn is higher than that for the switch $S^3$. These locking out values are illustrated diagrammatically in Fig. 3, wherein the ordinates represent current and the abscissæ time. As shown, $I'$, the locking out value of the switch $S'$, is higher than $I^2$, the locking out value of the switch $S^2$, which is higher than $I^3$, the locking out value of the switch $S^3$.

The operation of this controller is as follows: Closing the line switch S completes the motor circuit from the positive through the armature A, the field F, the windings $c^3$, $c^2$, $c'$, and the resistance sections $R'$, $R^2$, $R^3$, to the negative. The current being limited only by the resistance of the circuit rises at once to its maximum value represented by I in Fig. 3. Consequently, all the resistance switches are locked to the open position. After a while, due to the acceleration of the motor, the current in the motor circuit diminishes to the value $I'$, at which the resistance switch $S'$ is adjusted to operate, whereupon the said switch closes its contacts and short-circuits resistance section $R'$, which causes another rush of current in the motor circuit, but as the speed of the motor increases the current decreases until the speed is such that the current falls to the value $I^2$, at which the switch $S^2$ is adjusted to operate. At that moment the switch $S^2$ will close its contacts, short-circuit the resistance section $R^2$ and also short-circuit the operating winding $c'$ of the switch $S'$ which will drop to the open position. The operation of the switch $S^2$ causes another rush of current in the motor circuit which locks the switch $S^3$ to the open position, but as the motor accelerates the current decreases, and when it reaches the value $I^3$, at which the switch $S^3$ is adjusted to operate, the said switch will close its contacts, short-circuit the last resistance section $R^3$ and also the operating winding $c^2$ of the switch $S^2$ which drops to the open position. Another rush of current flows in the circuit and the said current diminishes gradually to its normal load value $I^4$. The circuit is now traced from the positive through the armature of the motor A, the field F, and the operating winding $c^3$ of the switch $S^3$, to the negative. It will be seen that owing to the different value of the locking current of the switches S′, $S^2$, $S^2$, the said switches will always operate in a proper sequence with a rapidity governed by the load on the motor. To stop the motor, the switch S is opened, whereupon the motor circuit is opened, the winding $c^3$ is deënergized, and the switch $S^3$ drops to the open position.

Referring now to Fig. 2, one contact of the switch $S^3$ is connected directly to the negative as in Fig. 1, but the second contact, instead of being connected to the upper terminal of the winding $c^3$ is connected to the lower terminal thereof. It follows that, when the switch $S^3$ closes its contacts, it also short-circuits its own operating winding $c^3$ and would drop were it not for a holding winding $H^3$, one end of which is connected to the positive and the other to the bridging piece of the switch $S^3$. It follows that, when the switch $S^3$ is closed, the holding circuit through the winding $H^3$ is energized and the said switch maintained in the closed position. Except as to the action of the switch $S^3$ just described, the operation of the system shown on Fig. 2 is the same as that shown on Fig. 1.

It will be evident to those skilled in the art that my controller can be used for the control of a shunt motor, and that reversing switches may be provided in case it is necessary to reverse the rotation of the motor.

It will also be apparent that my invention may be carried out with other forms of series-wound lock-open accelerating switches than those shown and described or referred to.

I claim—

1. In an electric controller, a circuit to be controlled, a plurality of switches arranged to close successively for controlling the circuit, windings for the switches for delaying their closure, the windings of the switches being all connected in the controlled circuit simultaneously, and connections whereby each switch except the first to close in closing short-circuits the winding of the preceding switch.

2. In an electric controller, a circuit to be controlled, a plurality of switches arranged to close successively for controlling the circuit, a winding for each switch for delaying its closure and for holding it closed, the windings of the switches being all connected in the controlled circuit simultaneously, and connections whereby each switch except the first to close in closing short-circuits the winding of the preceding switch.

3. In an electric controller, a circuit to be controlled, a plurality of switches arranged to close successively for controlling the circuit, a winding for each switch for delaying its closure, for closing it, and for holding it closed, the windings of the switches being all connected in the controlled circuit simultaneously, and connections whereby each switch except the first to close in closing short-circuits the winding of the preceding switch.

4. In an electric controller, a circuit to be controlled, a plurality of switches arranged to close successively for controlling the circuit, a winding for each for delaying its closure and for closing it, the windings of the switches being all connected in the controlled circuit simultaneously, and connections whereby each switch except the first to close in closing short-circuits the winding of the preceding switch.

5. In a motor control system, a motor, a motor circuit, resistance therefor, a plurality of switches for controlling the resistance, adapted to close in a predetermined order, windings for the switches for delaying their closure, connected in series with each other in the motor circuit, connections whereby the windings are all simultaneously energized by the motor current and whereby each switch in closing short-circuits a portion of the resistance and the winding of the preceding switch.

6. In a motor control system, a motor, a motor circuit, resistance therefor, a plurality of switches for controlling the resistance, adapted to close in a predetermined order, a winding for each switch for delaying its closure and for holding it closed, the windings being all connected in series with each other in the motor circuit, connections whereby the windings are all simultaneously energized by the motor current and whereby each switch in closing short-circuits a portion of the resistance and the winding of the preceding switch.

7. In a motor control system, a motor, a motor circuit, resistance therefor, a plurality of switches for controlling the resistance, adapted to close in a predetermined order, a winding for each switch for delaying its closure, for closing it and for holding it closed, the windings being all connected in series with each other in the motor circuit, connections whereby the windings are all simultaneously energized by the motor current and whereby each switch in closing short-circuits a portion of the resistance and the winding of the preceding switch.

8. In a motor control system, a motor, a motor circuit, resistance therefor, a plurality of switches for controlling the resistance, adapted to close in a predetermined order, a winding for each switch for delaying its closure and for closing it, the windings being all connected in series with each other in the motor circuit, connections whereby the windings are all simultaneously energized by the motor current and whereby each switch in closing short-circuits a portion of the resistance and the winding of the preceding switch.

9. In an electric controller, a circuit to be controlled, a plurality of switches arranged to close successively for controlling the circuit, a winding for each switch for delaying its closure and for holding it closed, the windings of the switches being all connected in series in the controlled circuit.

10. In an electric controller, a circuit to be controlled, a plurality of switches arranged to close successively for controlling the circuit, a winding for each switch for delaying its closure, for closing it and for holding it closed, the windings of the switches being all connected in series in the controlled circuit.

11. In an electric controller, a circuit to be controlled, a plurality of switches arranged to close successively for controlling the circuit, a winding for each switch for delaying its closure and for closing it, the windings of the switches being all connected in series in the controlled circuit.

12. In a motor control system, a motor, a motor circuit, resistance therefor, a plurality of switches arranged to close in a predetermined order for controlling the resistance, a winding for each switch for delaying its closure and for holding it closed, and connections whereby the windings are all connected in series with each other and simultaneously energized by the motor current.

13. In a motor control system, a motor, a motor circuit, resistance therefor, a plurality of switches arranged to close in a predetermined order for controlling the resistance, a winding for each switch for delaying its closure, for closing it and for holding it closed, and connections whereby the windings are all connected in series with each other and simultaneously energized by the motor current.

14. In a motor control system, a motor, a motor circuit, resistance therefor, a plurality of switches arranged to close in a predetermined order for controlling the resistance, a winding for each switch for delaying its closure and for closing it, and connections whereby the windings are all connected in series with each other and simultaneously energized by the motor current.

15. In a motor control system, a motor, a motor circuit, a plurality of starting resistance sections for the motor, a plurality of switches for cutting out the resistance sections, a winding for each switch for preventing its closure when the current in the winding is above a predetermined value, connections whereby the windings of the switches are all connected in series with each other in the motor circuit and simultaneously energized by the motor current, the switches being adapted to close when the current in the winding is below the predetermined value, and connections whereby each switch in closing shirt-circuits the said winding of the preceding switch and one of the resistance sections.

16. In a motor control system, a motor, a motor circuit, a plurality of starting resistance sections for the motor, a plurality of switches for cutting out the resistance sections, a winding for each switch for preventing its closure when the current in the winding is above a predetermined value, and for holding it closed, connections whereby the windings of the switches are all connected in series with each other in the motor circuit and simultaneously energized by the motor current, the switches being adapted to close when the current in the winding is below the predetermined value, and each switch being adapted to close at a different predetermined value, whereby the switches close in a predetermined order.

17. In a motor control system, a motor, a motor circuit, a plurality of starting resistance sections for the motor, a plurality of switches for cutting out the resistance sections, a winding for each switch for preventing its closure when the current in the winding is above a predetermined value, and for closing it and holding it closed when the current is below the predetermined value, each switch being adapted to close at a different predetermined value, whereby the switches close in a predetermined order, and connections whereby the windings of the switches are all connected in series with each other in the motor circuit and simultaneously energized by the motor current.

Signed at Morganton, N. C., this 21st day of August, 1916.

JAY H. HALL.